United States Patent [19]

Jacques

[11] 4,101,942
[45] Jul. 18, 1978

[54] TRACK FOLLOWING SERVO SYSTEM AND TRACK FOLLOWING CODE

[75] Inventor: James O. Jacques, Tracy, Calif.
[73] Assignee: Xerox Corporation, Stamford, Conn.
[21] Appl. No.: 732,634
[22] Filed: Oct. 15, 1976
[51] Int. Cl.² .............................................. G11B 21/10
[52] U.S. Cl. ..................................................... 360/77
[58] Field of Search ...................... 360/77, 78, 52, 75, 360/86, 97–99

[56] References Cited

U.S. PATENT DOCUMENTS

| | | | |
|---|---|---|---|
| 3,534,344 | 10/1970 | Santana | 360/77 |
| 3,691,543 | 9/1972 | Mueller | 360/77 |
| 3,812,533 | 5/1974 | Kimura | 360/77 |
| 3,893,180 | 7/1975 | Braun et al. | 360/77 |
| 3,959,820 | 5/1976 | Braun | 360/77 |

OTHER PUBLICATIONS

IBM Technical Disclosure Bulletin, vol. 18, No. 8, Jan. 1976, pp. 2556, 2557.
IBM Technical Disclosure Bulletin, vol. 19, No. 3, Aug. 1976, pp. 810–813.
IBM Technical Disclosure Bulletin, vol. 18, No. 7, Dec. 1975, pp. 2248, 2249.

Primary Examiner—John H. Wolff
Attorney, Agent, or Firm—Barry Paul Smith

[57] ABSTRACT

A data recording and reproducing system in which a disk having a plurality of data tracks has a track following code stored thereon, enabling a recording head moved by a servo system to be centered in relation to a desired track. The code includes, on one side of the track centerline, first regions of magnetic flux in which there is a first area of magnetic flux reversal, and, on the other side of the track centerline, second regions of magnetic flux in which there is a second area of opposite flux reversal adjacent the first area. The lines of flux in each area are equal. A recording head, when centered on the track centerline, detects no difference in the number lines of flux between the first and second areas due to its self-nulling properties, though the output signal of the head, which represents the rate of change of detected flux as the head traverses the two areas, may show differences at different points in time of detection. An integrator integrates the head output signal, which integrated signal thus represents such difference in the number of lines of flux and is an error signal used in the servo system to move the head on center, if needed. If the head is off center, a difference in number of lines of flux will be detected, thereby producing the error signal to move the head on center.

24 Claims, 19 Drawing Figures

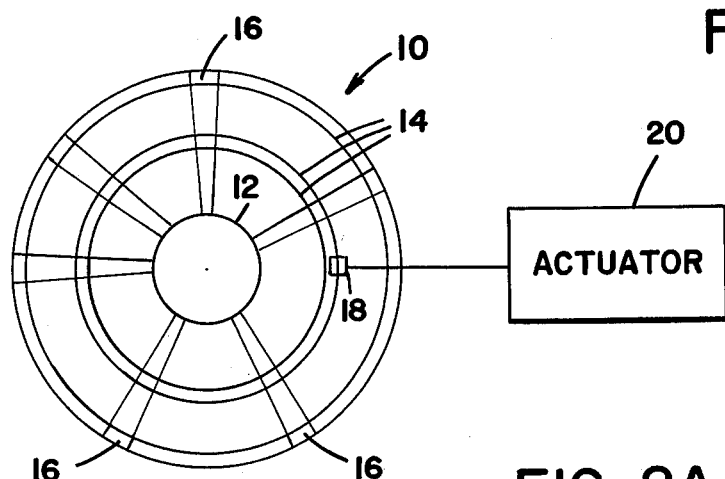
FIG_1
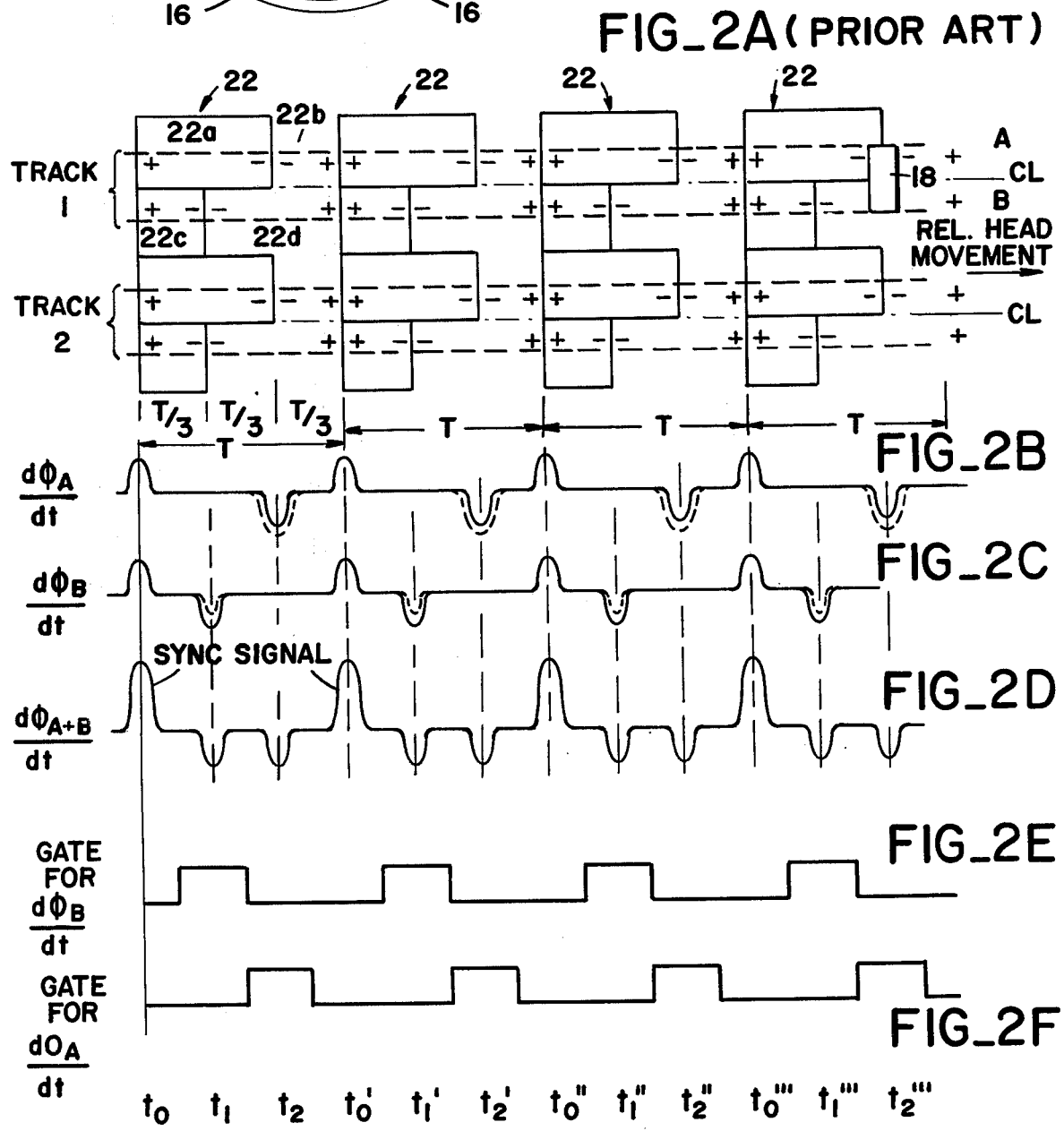
FIG_2A (PRIOR ART)
FIG_2B
FIG_2C
FIG_2D
FIG_2E
FIG_2F

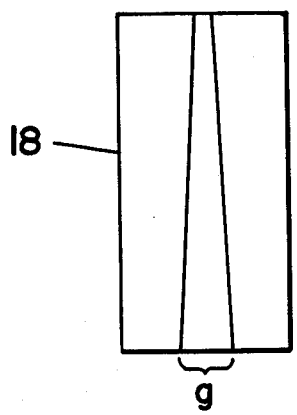
FIG_3A
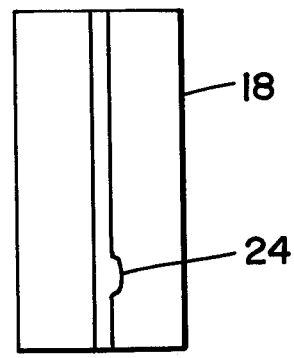
FIG_3B
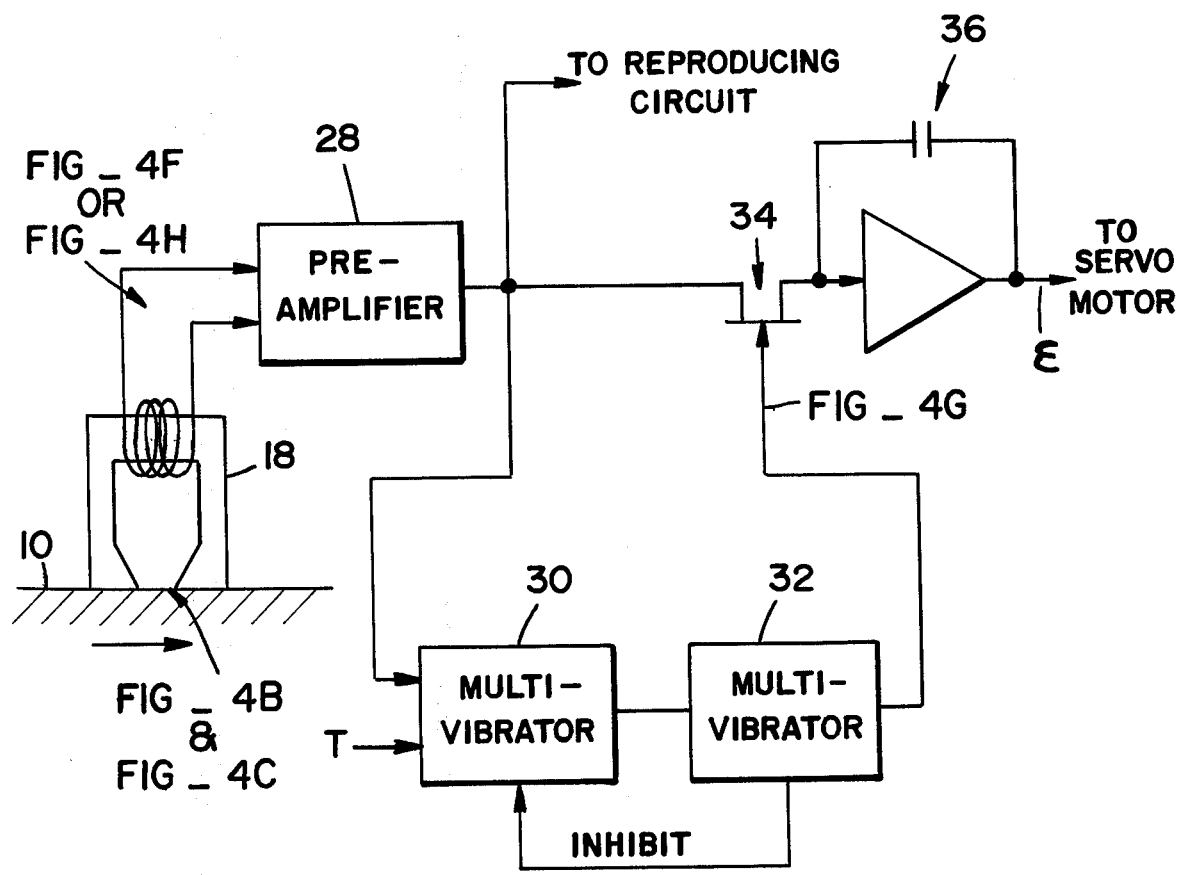
FIG_5

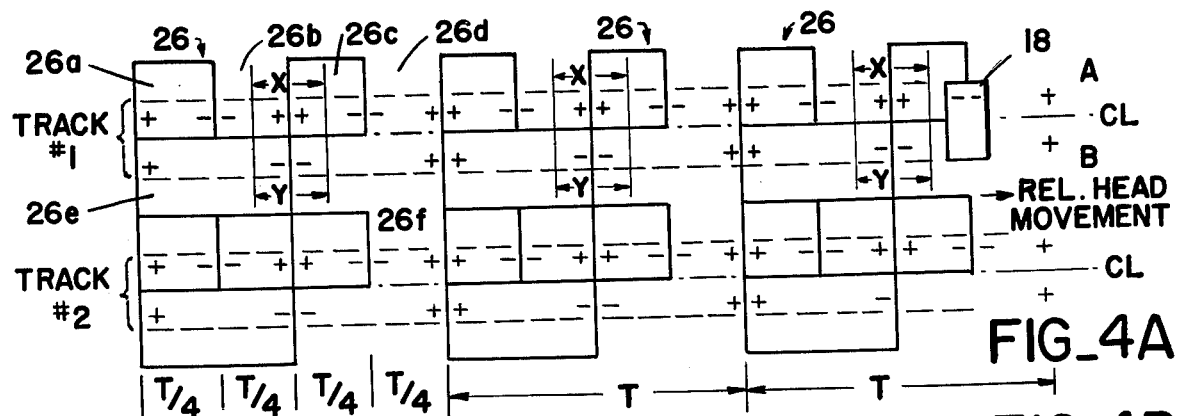
FIG_4A
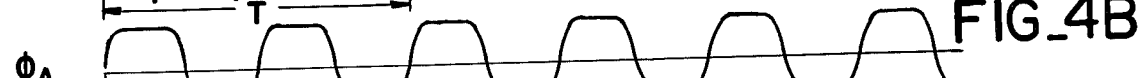
FIG_4B
FIG_4C
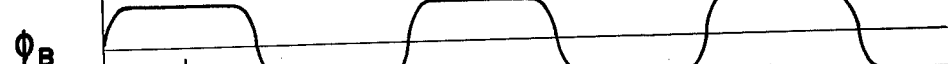
FIG_4D
FIG_4E
FIG_4F
FIG_4G
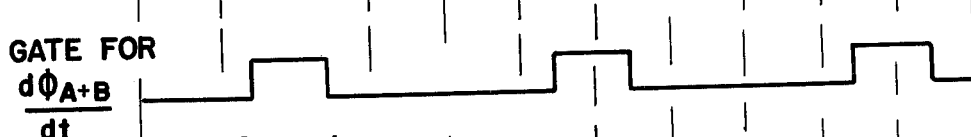
FIG_4H
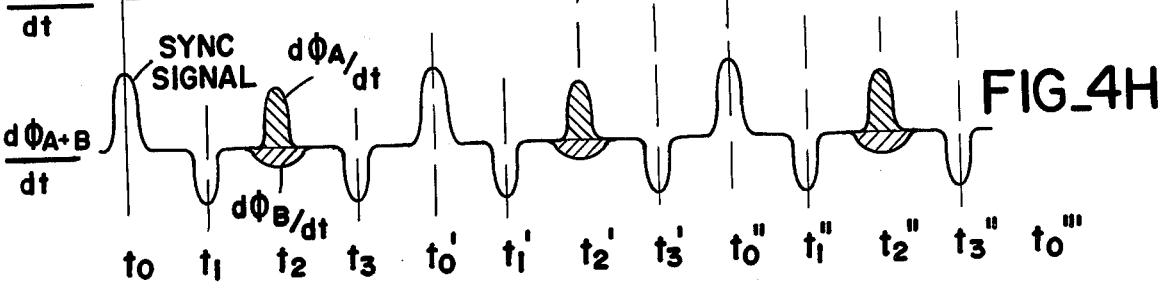
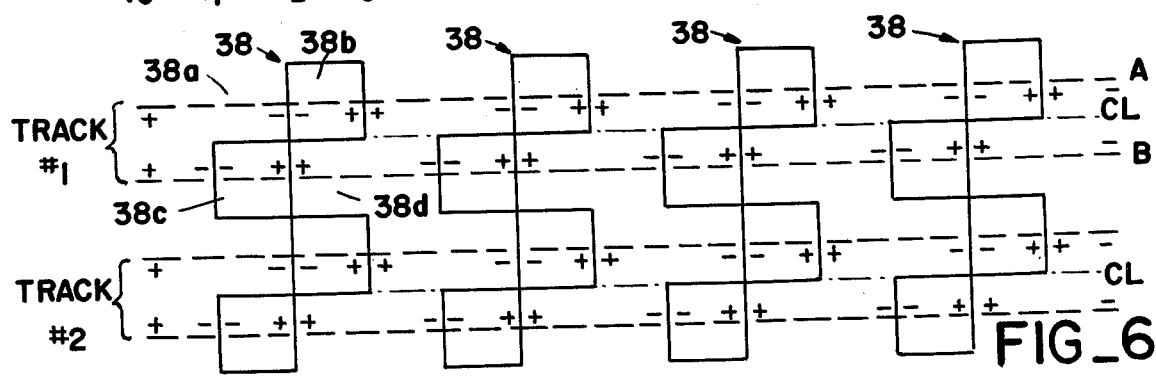
FIG_6

TRACK FOLLOWING SERVO SYSTEM AND TRACK FOLLOWING CODE

BACKGROUND OF THE INVENTION

The present invention relates to the positioning of a sensing device over a data record member and, more particularly, to a technique for enabling such device to follow accurately a desired track on the record member containing data to be retrieved.

In the field of data processing, use is frequently made of storage systems for storing large quantities of data. One form of these storage systems includes magnetizable rotating disks which have information placed serially on a plurality of concentric tracks located on each disk. This format of data storage is used in random access systems in which a transducer or head is positioned with respect to a desired track to reproduce or record the information.

To obtain random access to the information stored on the plurality of concentric tracks, means must be provided for positioning accurately the recording and reproducing head over the track containing the desired information. Prior to the introduction of high density disks having, for example, about 200 tracks per inch, it was sufficient to position the head merely in the vicinity of the desired track, i.e. largely ignoring thermal effects and disk runout, to record or reproduce the data. This "coarse" positioning was accomplished with a transducer which was not a part of, and therefore external to, the recording and reproducing head, but which was located on a carriage for moving the head radially across the tracks. However, with the advent of the high density disks, it became necessary to position the recording and reproducing head more accurately, preferably exactly centering the head with respect to the desired track.

One system for centering such head over the track includes a disk pack having a plurality of axially aligned disks mounted on and rotated by a common spindle. Each of the disk surfaces, except one, has only recording data, while the one surface has dedicated to it only head positioning or servo data. Each disk surface has a head movable over it, all the heads being bolted to a common movable carriage. Therefore, one head, which is the servo transducer, is associated with the disk surface storing the servo data, while the other heads, which are recording or reproducing transducers, are associated with the surfaces storing the recording data. The servo transducer senses the servo data so that error signals can be generated when such transducer is not centered in relation to a desired track, these error signals causing a servo motor to move the carriage until the transducer is so centered. As a result, the recording and reproducing heads, which are aligned with the servo transducer, presumably also will be positioned in relation to the center of their corresponding tracks to, for example, reproduce recording data from a selected disk surface.

One disadvantage with such system having a dedicated surface of servo data is that all the heads must be accurately aligned with respect to each other so that, for example, when the servo head is centered on a desired track number 20, the recording and reproducing heads also are centered on track number 20 of their respective disk surfaces. However, this alignment or calibration is easily subjected to human error, thereby resulting in misalignment of the heads. Also, it is not unlikely that the runout or wobble of the disks in the pack may be different for each disk, so that even if all the heads are accurately aligned, when the servo head is centered on track 20, one of the recording and reproducing heads may be deviated from track center. Furthermore, this servoing system normally is used with a disk pack containing at least ten disks or twenty disk surfaces where the servo overhead is only one dedicated surface out of twenty. If one desires to use a disk pack containing only one disk, then there is a high servo overhead since fifty per cent of the disk surfaces is used for servo data.

A system which overcomes the above disadvantages comprises a recording and reproducing head which also functions as a positioning or servo transducer. In this system, each disk surface in the disk pack includes both servo data and recorded data. The servo data is stored in a plurality of radially extending sectors spaced about the disk surface and on the same tracks as the recorded data. As the head associated with each disk surface follows a desired track, it senses the recorded data, and when it traverses a sector, it detects the servo data to align itself with the center of the desired track.

The above system using a head for both servoing and recording or reproducing has its own disadvantages. First, since in this system the recording and reproducing head is also the servo head, there is a problem of channel dynamics. That is, because the channel including the head has to operate over a wide bandwidth to process both the low and high frequencies of the servo data and recording data, respectively, high frequency channel noise can cause aliasing problems. Furthermore, each such head for each disk surface may have its own offset; that is, each head acting as a servo transducer may provide slightly offset information as to the position of the head, thereby requiring separate calibration of each head to account for the offset. This offset might be due, for example, to a chip in the head gap, or the gap cross-section along the entire length of the gap not being uniform.

The servo data, which can be used for either the dedicated surface system or the interspersed servo and recording data system described above, can comprise, for example, one of two codes known in the art, respectively, as the dibit and tribit codes. These codes include magnetized regions on both sides of the centerline of each track. As the head follows the track, peak amplitudes of the rate of change of flux on both sides of the centerline of the track are detected. If the head is not centered in relation to the centerline of the track, these peak amplitudes will not be equal, and an error signal will be generated to energize a servo motor to move the head and center it on the track, at which time these peak amplitudes will be equal so that no error signal is generated. The primary difference between the tribit code and dibit code is that the former contains its own timing or synchronizing information resulting in one method of peak amplitude detection, while the latter does not and therefore requires a different method of detection.

The dibit and tribit codes, and their manner of detection, have their own disadvantages. First, even if the head is centered on the desired track, it is possible to detect incorrectly that the head is off center. This is because the code itself is not designed to take into account the above-mentioned problems of head construction. For example, if the cross-section of the gap of a transducer is not uniform, such that the gap on one side of the head is slightly wider than the gap on the other side of the head, then the codes are such that different peak amplitudes of the respective change in fluxes will be detected. Consequently, the servo motor will move the head off center, though the head was centered. The same result will occur if the flying height of the head, i.e., the height of the head above the disk, is different on either side of the centerline of the track, as is not unusual.

Furthermore, any system using the dibit or tribit codes requires two separate channels to detect, respectively, the peak amplitudes of rate of change of flux on the left side and right side of the centerline desired track. This means that the electronics in each channel must be accurately designed and calibrated in relation to each other so that if the head is on center, one channel will not incorrectly indicate a higher peak amplitude with respect to the other channel. Concomitantly, the use of these two separate channels for detecting the peak amplitudes means a higher cost for the entire system. Furthermore, since the system using a dibit or tribit code is a peak amplitude detection system, it is possible that channel noise having a peak amplitude higher than the peak amplitude of the rate of change of flux may be detected during the time of detecting, for example, the peak amplitude for the left side of the track, thereby falsely indicating that the head is off center.

SUMMARY OF THE INVENTION

It is an object of the present invention to provide a novel technique for positioning one member with respect to another member.

It is another object of the present invention to overcome many of the above-noted disadvantages of the dedicated surface and interspersed systems, as well as the systems using the dibit or tribit codes.

A still further object of the present invention is to provide a novel code of servo data and a method and apparatus for detecting such code.

Another object of the present invention is to provide a transducer position indicating system in which a single transducer is used for position sensing and data recording or reproducing.

These and other objects of the present invention are obtained through the use of a unique code and code detecting system including a sensing head so that when the system integrates a signal representing only a particular part of the code, the output signal will be 0 if the head were centered in relation to a track, while the output signal will have a positive or negative value when the head is off center. This error signal is then used to servo the head to track center. In particular, the code includes, on one side of the centerline of a track, magnetized regions changing in one area from one flux polarity to the opposite flux polarity while, on the other side of the centerline, the code has magnetized regions changing from the opposite flux polarity to the one flux polarity in another area aligned with the one area. Also, the lines of flux in the respective areas on either side of the centerline of the track are equal. The head generates a signal representing the rate of change of flux for these areas, and then an integrator integrates this signal to obtain the difference between the amounts of flux passing through the head on both sides. If the head is centered, the amount of flux passing through either side of the head will be equal and opposite in polarity, thereby producing no error signal. If the head is not centered, there will be a difference in the amounts of flux detected, thereby resulting in an error signal which controls a servo motor to center the head in relation to the centerline of the track.

BRIEF DESCRIPTION OF THE DRAWINGS

FIG. 1 is a schematic representation of a magnetizable recording disk having interspersed servo data and recording data and showing the relative position of a head to the disk.

FIGS. 2A-2F illustrate the prior tribit code and timing diagrams for indicating how such code is detected.

FIGS. 3A and 3B are, respectively, enlarged bottom views of a recording and reproducing head.

FIGS. 4A-H are illustrations of the novel code of the present invention and timing diagrams indicating the manner of detecting the code.

FIG. 5 is a schematic circuit diagram of the present invention.

FIG. 6 is an alternative embodiment of the novel code of the present invention.

DETAILED DESCRIPTION OF THE DRAWINGS

FIG. 1 shows a representation of a recording medium in the form of a magnetizable disk 10. The disk 10 is mounted for rotation on a shaft 12 which is driven by a motor (not shown). A plurality of concentric tracks 14, only a few of which are shown, are arranged on the disk surface from its inner circumference adjacent spindle 12 to its outer circumference. A number of sectors 16 are spaced about the disk surface and traverse the surface radially from the inner to outer circumference of the disk 10.

Each track 14 has magnetic data read or recorded by a head 18 which is movable in a radial direction across the tracks by an actuator 20. Each track 14 in each sector 16 has servo data which is sensed by head 18 to determine the relative position of the head with respect to the centerline of the track for track following purposes, while the areas of the track between the sectors 16 are allocated for recording data which is to be recorded or reproduced. The head 18 is of any conventional type which is used for both recording or reproducing the data between the sectors 16, and reading the servo data within the sectors 16.

FIG. 2A shows the relative position of the head 18, two tracks, and servo data within sectors 16. As shown, the servo data is the prior art tribit code 22 and is so named because it extends a distance T with three magnetized regions each segmented in multiples of T/3. Four of the tribit codes 22 are illustrated in FIG. 2A for each track shown, though each sector 16 may have substantially more than this number. The tribit code includes one region 22a of a stable magnetic flux of one polarity (e.g. + to −) extending a distance 2T/3 on one side A of the centerline of a track, followed by a region 22b of a stable magnetic flux of the opposite polarity (− to +) extending a distance T/3. The tribit code also includes another region 22c of magnetic flux of the one polarity (+ to −) extending a distance T/3 on the other side B of the centerline of the track, followed by a region 22d of magnetic flux of the opposite polarity (− to +) extending a distance 2T/3. As indicated, each region 22a, 22b, 22c, 22d extends widthwise from the centerline of the track to a point outside of the track.

The manner in which systems using a tribit code operate to allow a head to follow a track will now be described. In FIG. 2A, the head 18 is shown as being centered with respect to the centerline of track #1. As the head 18 crosses the left end of one of the codes 22 at about $t_0$, it detects a magnetic flux reversal of the same direction provided by regions 22a and 22c on both sides of the centerline of track #1. The head 18, in a known manner, then generates an output signal indicative of the rate of change of flux ($d\phi/dt$). The amplitude of this rate of change, at time $t_0$, for each side A,B of the centerline of track #1 is shown in FIGS. 2B and 2C, respectively. Since the head 18 is centered on track #1, these amplitudes ($d\phi A/dt;d\phi B/dt$) will be equal.

As the disk 10 continues to rotate, at about time $t_1$ there will be another flux reversal at the end of the region 22c. The head 18 therefore will generate a signal at such time $t_1$ indicative of the amplitude of this rate of change of flux as shown in FIG. 2C. Then, as the disk 10 further rotates, at about time $t_2$ there will be another flux reversal near the end of region 22a and beginning of region 22b. The head 18 will detect the amplitude of the rate of change of the flux and produce the signal shown in FIG. 2B at such time $t_2$. Again, since the head 18 is assumed to be centered on the track #1, the signals produced at times $t_1$ and $t_2$ will be of equal amplitude.

The combined signal produced by the head 18 being centered on the track over regions 22a, 22b, 22c and 22d is shown in FIG. 2D. At time $t_0$, the amplitudes produced by the head 18 detecting regions 22a and 22c are added to produce a signal having twice the amplitude from each region 22a, 22c, while the signals produced at times $t_1$ and $t_2$ are of the same amplitude as shown in FIGS. 2B and 2C. The signal shown in FIG. 2D is then sent to well-known circuitry (not shown) for indicating the relative position of the head 18 to the track. When such circuitry receives the waveform shown in FIG. 2D, a threshold detector detects the amplitude of the signal generated at time $t_0$ and produces a synchronizing signal indicating that this is the beginning of the tribit code. It may be noted that no matter where the head 18 is located with respect to the centerline of track #1 at time $t_0$, the amplitude of the signal at this time will always be the same. For example, if at time $t_0$ head 18 were positioned more over region 22a than 22c, the signal shown in FIG. 2B will have a higher amplitude than the signal shown in FIG. 2C; however, the sum of these two signals will be the same as if the head 18 were centered on the centerline of track #1 and, therefore, the signal at time $t_0$ can be used as a synchronizing signal.

The waveform of FIG. 2D is transmitted through two separate channels of such well-known circuitry, and in each channel gate signals shown centered about times $t_1$ and $t_2$ are generated in response to the synchronization signal, as shown in FIGS. 2E and 2F, respectively. As a result, in one channel the signal generated at about time $t_1$ is gated through to a sample and hold circuit which determines the peak amplitude of the signal occurring during the gate time. The signal occurring at about time $t_2$ is also gated through the other channel to another sample hold circuit which determines its peak amplitude occurring during the gate time. The two peak amplitude detected signals are then sent in phase to a comparator which compares these amplitudes. In the present example, since the head 18 is centered on the centerline of track #1, these amplitudes will be equal, thereby indicating properly, the position of the head. It will be seen that if, for example, the head 18 is off center and positioned more over side A than side B of the centerline, then the detected peak amplitudes would be different. This is indicated by the waveform shown in dash lines in FIGS. 2B and 2C, respectively, in which the amplitude of a signal detected at time $t_1$ is lower than the amplitude of the signal detected at time $t_2$. Consequently, in this condition in which the head is off center, the comparator will detect a difference in the peak amplitudes to generate thereby an error signal which is used in a well-known manner to control the actuator 20 to center the head. The above process continues for each detection of the code 22 as indicated by the waveforms at times $t'_0, t'_1, t'_2$, etc., shown in FIG. 2A.

As already indicated, significant problems exist when the method of peak amplitude detection is used for a track following system. For example, as shown in FIG. 3A, the gap $g$ of the head 18 may have a cross-section which is not uniform along the length of the gap. This could be due, for example, to errors in the manufacture of the head. This means that even if the head 18 shown in FIG. 3A were centered on track #1, there would be a wider gap over, for example, region 22a as opposed to the gap passing over region 22c.

As a result of this difference in cross-section, the amplitudes of the rate of change of magnetic flux as seen at times $t_1$ and $t_2$ will be different with respect to each other, even though the head is on center. Consequently, the peak amplitude detection circuitry will detect a difference in peak amplitudes and produce an error signal to cause the actuator 20 to move the head 18 off center. This same result will occur if, for example, the gap in the head 18 has a chip 24 in it, as shown in FIG. 3B. Such result will also occur if the flying height of the head is such that the portion of head 18 on side A of the track centerline is at a greater distance from the surface of disk 10 than the portion of the head 18 over side B. These three conditions are not unlikely to occur in track following systems, so that it is likely that a head which is, in fact, centered on the centerline of a track will undesirably be offset therefrom.

FIG. 4A illustrates the novel code of the present invention and the relation of the head 18 with respect to the centerline of a track, while FIGS. 4B–4H disclose waveforms helpful in the understanding of the invention. Three codes 26 are shown in FIG. 4A, for each track, and these will be stored in the sectors 16; however, this number of codes for each track is shown merely for illustrative purposes and a greater number can be stored in the sectors 16. The code 26 has a distance T which may be segmented into regions of multiples of T/4. The code 26 includes, on one side A of the track centerline, a region 26a of magnetic flux of one polarity (e.g. + to −) extending a distance T/4, followed by a region 26b of magnetic flux of opposite polarity (− to +) extending a distance T/4, which is followed by a region 26c of magnetic flux of the one polarity (+ to −) extending a distance T/4, which in turn is followed by region 26d magnetic flux of the opposite polarity (− to +) extending a distance T/4. The code 26 also includes, on the other side B of the track centerline, a region 26e of magnetic flux having the same polarity (+ to −) as region 26a and extending a distance T/2, followed by a region 26f of magnetic flux having the opposite polarity (− to +) of region 26e and extending a distance T/2. As shown, the regions 26a–26d on the one hand, and the regions 26e–26f on the other hand, extend widthwise beyond the track. It is important to note that in an area X of change from region 26b to region 26c, there is one flux reversal while in the area Y of change from region 26e to 26f, there is an opposite flux reversal. Furthermore, at least in these two areas X and Y, and preferably in all the regions, the number of lines of flux on opposite sides A,B of the centerline of the track should be equal.

FIGS. 4B and C are waveforms of the amount of flux $\phi$ detected by the head 18. FIG. 4B shows the amount of flux $\phi_A$ detected by the portion of head 18 traversing regions 26a-26d. FIG. 4C shows the amount of flux $\phi_B$ detected by the portion of head 18 traversing regions 26a and 26f. Thus, these two waveforms represent the input to the head 18.

FIG. 4D shows the rate of change of flux $d\phi_A/dt$ for the portion of head 18 detecting regions 26a-26d, while FIG. 4E shows the rate of change of flux $d\phi_B/dt$ for the portion of head 18 detecting regions 26e-26f. FIG. 4F shows the combined waveform of FIGS. 4D and 4E, which is the output of head 18. FIG. 4G is a waveform of gating signals for gating the waveform of FIG. 4F. FIG. 4-H is a waveform of the rate of change of the flux which will be helpful for explaining the manner in which the position of the head 18 is accurately detected even if it has a gap of non-uniform cross-section or a chip as shown in FIGS. 3A and 3B.

FIG. 5 illustrates the circuitry of the present invention for generating an error signal to energize the servo motor of the actuator 20 to center the head 18 with respect to the centerline of the track. This figure also shows the points at which various of the waveforms appear in the circuit. FIG. 5 shows, schematically, the head 18 flying over the disk 10, which rotates in the direction shown by the arrow. The output signal of head 18 is fed to a pre-amplifier 28 to pre-amplify such signal. The output signal of amplifier 28 is then fed to a reproducing circuit which reproduces, in a well-known manner, only the recording data on the tracks between sectors 16. The amplified signals from amplifier 28 are also fed to a single-shot multivibrator 30, which produces an output signal when the amplitude of the input signal is greater than a threshold T discussed more fully below. Another single-shot multivibrator 32 is connected to multivibrator 30 and is responsive to the trailing edge of the output of multivibrator 30 to produce the gate signals shown by the waveform in FIG. 4G. The output of pre-amplifier 28 is also fed to a field effect transistor 34 which is responsive to the output or gate signal from multivibrator 32. The signal from amplifier 28 gated through transistor 34 is then integrated by integrator 36, the output signal of which is an error signal $\epsilon$ used to drive the servo motor in a well known manner to move the head 18 to cause it to follow the track.

In operation, as disk 10 rotates, the head 18 will traverse a sector 16 to begin detection of the code shown in FIG. 4A. This discussion will continue assuming that the head 18 is centered with respect to the centerline of track #1, as shown in FIG. 4A. At about time $t_0$, shown below FIG. 4H, the head 18 detects the amount of flux $\phi$ passing through it. Between times $t_0$ and $t_1$, the amount of flux $\phi$ detected by the head 18 on either side A,B of the centerline of track #1 is the same, as shown by the waveforms in FIGS. 4B and 4C, respectively. At about time $t_1$, there is a flux reversal from region 26a to region 26b, the amount of flux then detected by the head 18 being shown for the interval $t_1-t_2$ in FIGS. 4B and 4C. Then, at about time $t_2$, there is one flux reversal between regions 26b and 26c, on the one hand, and an opposite flux reversal between regions 26e and 26f on the other hand. The amount of flux detected by the head 18 in region 26c is shown in waveform $\phi_A$ for the interval $t_2-t_3$, while the amount of flux detected in the region 26f is shown by the waveform $\phi_B$ in this interval. Then, at about time $t_3$, there is another flux reversal between regions 26c and 26d with the amount of flux now being detected by head 18 on side A as shown in waveform $\phi_A$ for the interval $t_3-t_4$. Finally, at about time $t_4$ there is the same flux reversal occurring on sides A and B of track centerline. The amount of flux detected for the other repeats of the code 26 will be the same as previously described for the intervals $t'_0-t'_4$, and $t''_0-t''_4$, when the head is centered on the track.

The output signal of the head 18 is a signal having the waveform shown in FIG. 4F, as already mentioned. The output signal produced at time $t_0$, is always of constant amplitude regardless of the position of head 18 with respect to the centerline of the track. Therefore, this signal is used as a synchronization signal to generate the gate signal shown in FIG. 4G. This is similar to the synchronization signal shown in FIG. 2D used to generate the gate signals of FIGS. 2E and 2F.

After amplification by pre-amplifier 28, the signal from head 18 is fed to the multivibrator 30 which has the threshold T related to the expected amplitude of the synchronization signal shown in FIG. 4F. The threshold T is higher than the peak amplitude of the signals generated at times $t_1$ and $t_3$ so that they do not activate the multivibrator 30, but lower than the peak amplitude of the signal generated at time $t_0$. When the synchronization signal is received by the multivibrator 30, it provides an output of predetermined duration, the trailing edge of which then activates multivibrator 32 to provide a gating signal centered in relation to the time $t_2$ and whose width is T/4. This gating signal is also fed back as an inhibit signal to multivibrator 30 to prevent the multivibrator from being activated again by, for example, noise during the gating of transistor 34. Consequently, as may be appreciated, the multivibrators 30 and 32 are timed such that the transistor 34 is gated to pass the portion of the signal shown in FIG. 4F corresponding to the areas X and Y of flux reversal. This gated signal is then integrated by integrator 36 to produce the error signal $\epsilon$ as indicated above. As will be appreciated, therefore, the input to the integrator 36 is a signal representing the rate of change of flux detected by head 18 over the interval indicated by the gating signals; however, the output of the integrator 36 is a signal $\epsilon$ which represents the difference in amount of flux between sides A and B passing through the transducer 18 during this interval.

As will be appreciated from the waveforms shown in FIGS. 4B and 4C, with the head 18 centered on the track #1, the amount of flux $\phi_A$ being detected in the area X is equal to the amount of flux $\phi_B$ being detected by the head 18 in the area Y. While these amounts are equal, the flux reversals in these areas X,Y are opposite to each other. Therefore, the head 18 performs a self-nulling function, which means that the difference in the amount of flux detected by one side of the head traversing regions 26b and 26c with respect to the other side of the head traversing regions 26e and 26f is zero. Also, assuming there are no flaws in the head, such as shown in FIGS. 3A and 3B, the rate of change of flux on side A of the track centerline is equal and opposite to the rate of change of flux on the side B of the centerline, as indicated in FIGS. 4D and 4E at time $t_2$. The integrator 36, therefore, will integrate a signal representing a zero difference in rate of change of flux at time $t_2$ as shown in FIG. 4F. Accordingly, the output signal $\epsilon$ is zero, representing that there is no difference in the amount of flux detected between areas X and Y, thereby indicating that the head is centered on the track. If the head 18 is off center, then there will be a difference in the amount of flux detected between sides A and B of the track centerline, i.e., the head will not self-null, thereby resulting in the generation of a signal $\epsilon$ representing this difference and having a polarity depending on the off centered position of the head. For example, if the head 18 is off center to the left, i.e., with more of the gap $g$ over side A than side B, $\epsilon$ will have a positive polarity causing the servo motor of actuator 20 to move the head to the right to center it over the track.

FIG. 4H illustrates the signal waveform produced by the head 18 when it is centered on the centerline of the track, but when there is a flaw in it, such as the gap being non-uniform in cross-section or one side having a chip, as shown in FIGS. 3A and 3B, respectively. Furthermore, this waveform has been altered to show, during the sampling time centered about $t_2$, the contributions made, respectively, by the respective head sides traversing sides A and B to explain the invention more clearly. Because of this flaw, when the head 18 is centered on the track and traverses the areas X and Y of transition from code regions 26b to 26c and 26e to 26f, the rate of change of flux will be different for one side of the head with respect to the other side of the head, as illustrated in FIG. 4H during the sampling window centered about time $t_2$. However, irrespective of these flaws in a head, the amount of flux through which the one side of the head passes is equal to the amount of flux through which the other side of the head passes, since, as already mentioned, at least these areas X and Y of the code are written or magnetized with equal amounts of flux. Consequently, the integral of the areas of the curves of FIG. 4H during such sampling window, which is the amount of flux passing through the head, are equal and opposite. Therefore, when this portion of the waveform of FIG. 4H is integrated by integrator 36, the output signal $\epsilon$ will be zero, thereby indicating correctly that the head is on center. The same result will occur also if, for example, the flying height of the transducer is different on opposite sides of the centerline of the track, with the head on center.

In view of this integration, any aliasing noise in the system will be prevented and not affect the movement of the actuator 20. That is, if high frequency noise, or more precisely, noise at the high frequency portion of the bandpass, is interposed on the waveform of FIG. 4F or 4H during the sampling time shown in FIG. 4G, this noise will be integrated to zero over this sampling period, thereby resulting in an error signal equal to zero. Thus, problems of channel dynamics mentioned previously, including aliasing noise, are obviated.

The present invention, therefore, provides a relatively simple structure for enabling a head to follow accurately the track. The invention takes advantage of the self-nulling properties of the head which may be of any conventional type. Because of this self-nulling property, only one channel of electronics is required to produce the error signal $\epsilon$, whereas in prior peak detection type systems, separate channels are needed to detect the peak amplitudes of rate of change of flux occurring on either side of the centerline of the track. Perhaps even more importantly, by determining the difference in flux being detected by one side of the head as opposed to the other side, the problems associated with a gap of non-uniform cross-section, chips in the gap, and/or head flying height, as in prior art systems, are eliminated. Furthermore, the present invention is substantially reduced in cost, not only because it requires only a single channel of electronics, but the elements of the one channel are relatively inexpensive, comprising the basic elements shown in FIG. 5, including the integrator 36.

Furthermore, the particular code of FIG. 4A, is free from low frequency harmonics as compared, for example, to the tribit code which has harmonics down to d.c. This can be appreciated from the waveforms of FIGS. 4B and 4C which show, respectively, equal and opposite fluxes for the period T. Such waveforms are a result, of course, of each region on side A being of equal length (T/4) and each region on side B being of equal length (T/2). In the tribit code of FIG. 2A, the regions on side A are 2T/3 and T/3, respectively, while the regions on side B are 2T/3 and T/3, respectively. Thus, a waveform similar to FIGS. 4B and 4C for the tribit code would clearly show unequal flux for its period T for each side A and B, thereby indicating this code has harmonics down to d.c. Consequently, the present system does not require a wider channel at the lower frequency of the band while a system using the tribit code does, to account for such lower harmonics. This wider channel is undesirable for a recording head when it has to switch from writing to reading recording data, as would be known.

As one specific example for the dimensions of the code of the present invention, if the track width is 0.005 inches, then regions 26a–26d and regions 26e–26f will have widths of 0.005 inches. Thus, ½ the width of each region will be within the track. The length T/4 will be 0.0008 inches so that each region 26a–26d has a length of 0.0008 inches, while each region 26e–26f has a length of 0.0016 inches.

With respect to the threshold T for multivibrator 30, it may be seen that false synchronization could occur if the head 18 were positioned totally over side A of the track centerline at time $t_2$ of FIG. 4A. At this time, the peak amplitude of $d\phi_A/dt$ would be equal to the amplitude of the synchronization signal. While the threshold T is set at approximately 50% of the amplitude of the amplitude of the synchronization signal, false synchronization can be prevented if this invention is used in conjunction with well-known "coarse" positioning servo systems which would first coarsely position the head 18 in relation to a desired track before use of the present invention. Such coarse positioning systems can position the head such that the maximum amplitude error signal of the same polarity as the synchronization signal is less than 50%, i.e., the head will not be coarsely positioned totally over side A.

As a further "fail-safe" checking technique, in a system where the servo data is constrained to precise intervals around the disk, such as sectors 16, separate sector timing (not shown, but well-known) defines the general area of the servo data. Therefore, if the code is constrained to start with a synchronization signal as the first signal after detection of a sector timing mark, then false or missing synchronization signals can be detected.

FIG. 6 illustrates another example of a code of the present invention. This code 38 is identical to the code 26 in that it has areas X and Y having equal lines of flux on opposite sides of the centerline of the track, and in which when there is a flux reversal on one side A of the track centerline, there is an opposite flux reversal on the other side of the centerline. The code 38 includes a magnetized region 38a having lines of flux of one polarity, followed by a magnetized region 38b of lines of flux of opposite polarity, each region extending on one side A for a distance which is a multiple of T/3. On the other side B of the centerline, the code 38 includes a magnetized region 38c opposite in polarity to the region 38a, followed by a region 38d opposite in polarity to the region 38b, each of these two regions extending for multiples of T/3. The region 38a extends for a distance 2T/3, the region 38b extends for a distance T/3, the region 38c extends for T/3 and region 38d for 2T/3.

This alternative code also can be detected by the structure shown in FIG. 5 so that only the signal portion representing the areas X and Y is gated through transistor 34 to be integrated by integrator 36, thereby producing an error signal ε corresponding to any difference in flux between such areas passing through the head. However, since the code shown in FIG. 6 does not have its own timing signal, that is, there is no portion of the code which can produce the synchronization signal shown in FIG. 4F, a separate timing track on the disk 10 will be required to indicate the beginning of the code period. This timing signal can be fed to multivibrator 30 in lieu of the output of amplifier 28, so that transistor 34 can be gated at the proper time to integrate the signal representing areas X and Y.

While the invention has been particularly described in connection with an interspersed data system, it can also be used in a dedicated surface type system. In the latter, the code of the present invention is written only on one dedicated surface of the disks in the disk pack, and a separate read only transducer is used to detect the code so that the transducer output signal can be integrated in the manner already described.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data storage member comprising: a track; and a tracking code for positioning a transducer with respect to said track, said code including:
   (a) a first path including a first region of magnetic flux of one polarity followed by a second region of magnetic flux of opposite polarity and preceded by a fifth region of magnetic flux of said opposite polarity; and
   (b) a second path adjacent said first path and including a third region of magnetic flux of said opposite polarity followed by a fourth region of magnetic flux of said one polarity, wherein said second region follows said first region and said fourth region follows said third region at substantially the same positions on said storage member in their respective paths, and wherein the number of lines of flux in passing from said first region to said second region is equal to the number of lines of flux in passing from said third region to said fourth region, said third region and said fifth region commencing in their respective paths at substantially the same positions on the storage member.

2. A data storage member according to claim 1 wherein said first path and said second path extend a distance T on the storage member, said first region, said second region and said fifth region each extending a distance T/4, and said third region and said fourth region each extending a distance T/2.

3. A data storage member according to claim 2 wherein said code further comprises, in said first path, a sixth region of magnetic flux of said one polarity, said sixth region following said second region and extending a distance T/4.

4. A data storage member according to claim 3 wherein said first path extends lengthwise only on one side of the centerline of said track, and said second path extends lengthwise only on the other side of the centerline of said track.

5. A data storage member according to claim 4 wherein said first path extends widthwise from the centerline of said track beyond said track, and said second path extends widthwise from the centerline of said track beyond said track.

6. A data storage member according to claim 5 further comprising a plurality of said codes at predetermined positions on the storage member.

7. A system for following a track on a data storage member having stored thereon a code extending in first and second adjacent paths, the first path including a first region of magnetic flux of one polarity followed by a second region of magnetic flux of opposite polarity, the second path including a third region of magnetic flux of the opposite polarity followed by a fourth region of magnetic flux of the one polarity, wherein the second region follows the first region and the fourth region follows the third region at substantially the same positions on the storage member in their respective paths, and wherein the number of lines of flux in passing from the first region to the second region is equal to the number of lines of flux in passing from the third region to the fourth region, said system comprising:
   (a) means, movable relative to the storage member, for sensing the lines of flux in passing from the first region to the second region and from the third region to the fourth region, and for generating a first signal representing the rate of change of the sensed flux;
   (b) means for integrating said first signal to produce a second signal representing the difference in flux sensed by said sensing and generating means between the flux in the first path and the flux in the second path; and
   (c) means, responsive to said second signal, for centering said sensing and generating means in relation to the centerline of the track.

8. A system according to claim 7 wherein said sensing and generating means includes a transducer having a self-nulling property so that when said transducer is centered in relation to the track the difference in flux sensed is a predetermined value.

9. A data recording and reproducing system, comprising:
   (a) a disk including a track for storing recording data and having a tracking magnetic code stored thereon, said code including first regions of magnetic flux on one side of the centerline of said track and second regions of magnetic flux on the other side of the centerline of said track, said first regions providing a first area of flux reversal and said second regions providing a second area of opposite flux reversal adjacent said first area;
   (b) a recording head, movable over said first regions and said second regions, for detecting the number of lines of flux passing through said head, said head including means for generating a first signal representing the rate of change of detected flux;

(c) means for integrating said first signal only over a first portion corresponding to the rate of change of detected flux at said first area and said second area to produce a second signal representing differences in detected flux; and (d) means, responsive to said second signal, for positioning said recording head in relation to the centerline of said track.

10. A data recording and reproducing system according to claim 9 wherein said means for integrating comprises:

(a) means, responsive to a timing signal indicating the start of said code, for generating a gating signal synchronized with the time of detection of said first area and said second area;

(b) means, receiving said first signal and responsive to said gating signal, for gating therethrough said first signal portion; and (c) an integrator which receives said first signal portion.

11. A data recording and reproducing system according to claim 10 wherein said first regions comprise a third region of magnetic flux of one polarity adjacent to and followed by a fourth region of magnetic flux of opposite polarity, said first area including the end of said third region and beginning of said fourth region, and wherein said second regions comprise a fifth region of magnetic flux of said opposite polarity followed by and adjacent to a sixth region of magnetic flux of said one polarity, said second area including the end of said fifth region and beginning of said sixth region.

12. A data recording and reproducing system according to claim 11 wherein said first regions further comprise a seventh region of magnetic flux of said opposite polarity adjacent to and preceding said third region, said seventh region and said fifth region commencing on their respective sides of the track centerline at the same position on said track.

13. A data recording and reproducing system according to claim 12 wherein said gate signal generating means comprises means receiving said first signal and responsive only to a second portion of said first signal corresponding to the detection of the commencement of said fifth region and said seventh region, said second portion being said timing signal.

14. A data recording and reproducing system according to claim 13 wherein said code extends lengthwise for a distance T, said first regions comprising an eighth region of magnetic flux of said one polarity following and adjacent to said fourth region, said third, fourth, seventh and eighth regions each extending a distance T/4 and said fifth and sixth regions each extending a distance T/2.

15. A data recording and reproducing signal according to claim 14 wherein all of said regions contain an equal number of lines of flux.

16. A data recording and reproducing system according to claim 11 wherein said gate signal generating means comprises:

(a) a first multivibrator having a predetermined threshold and receiving said timing signal, said first multivibrator generating a first output of predetermined duration when the amplitude of said timing signal exceeds said threshold; and (b) a second multivibrator, responsive to said first output, for generating a second output of predetermined duration comprising said gating signal.

17. A data recording and reproducing system according to claim 16 wherein said gating means comprises a field effect transistor.

18. A data recording and reproducing signal according to claim 17 wherein said gate signal generating means further comprises means for feeding back said second output to said first multivibrator to inhibit said first output for the duration of said second output.

19. A data recording and reproducing signal according to claim 9 wherein said first area and said second area contain an equal number of lines of flux.

20. A method for accessing data stored on a record member having a data track, the data including a magnetic code having in one path a first area of magnetic flux reversal and in another path adjacent the one path a second area of opposite magnetic flux reversal, the first area being adjacent the second area, the first area and the second area having an equal number of lines of flux, comprising the steps of:

(a) moving a magnetic sensing element over the first area and the second area to sense the lines of flux;

(b) generating a first signal representing the rate of change of flux sensed by the sensing element;

(c) integrating the first signal to generate a second signal representing the difference in lines of flux sensed between the first area and the second area; and (d) positioning the sensing element, in reponse to the second signal, to sense a predetermined difference in number of lines of flux.

21. A method for sensing data magnetically recorded on a track on a magnetizable disk, the data including a code having a first path on one side of the centerline of the track and an adjacent second path on the other side of the centerline of the track, the first path including a first region of magnetic flux of one polarity bordering on and followed by a second region of magnetic flux of opposite polarity, the second path including a third region of magnetic flux of the opposite polarity bordering on and followed by a fourth region of the one polarity, the border in the second path being adjacent the border in the first path, and all the regions having an equal number of lines of flux, comprising the steps of:

(a) moving a magnetic recording head simultaneously over the first path and the second path to sense the lines of flux;

(b) generating an output signal representing the rate of change of flux sensed by the recording head; and (c) integrating only a portion of the output signal corresponding to predetermined areas on both sides of the borders in the first path and the second path, whereby the integrated signal corresponds to any difference in number of lines of flux detected by the recording head.

22. A method according to claim 21 wherein the step of integrating comprises:

(a) detecting the commencement of the code and generating a timing signal thereby;

(b) generating a gating signal, in response to the timing signal, to gate the signal portion through a gating means; and (c) feeding the gated signal portion to an integrator.

23. A method according to claim 22 wherein the step of generating a gating signal comprises:

(a) feeding the output signal to the gating means; and (b) generating a gating signal at a time corresponding to the time of sensing the code at the borders, the gating signal having a width corresponding to the predetermined areas on both sides of each border.

24. A method according to claim 23 further comprising using the integrated signal to center the recording head in relation to the track centerline.

* * * * *